United States Patent

[11] 3,592,386

| [72] | Inventor | Jay Tschudy, Jr.<br>Shawnee Mission, Kans. |
|---|---|---|
| [21] | Appl. No. | 793,455 |
| [22] | Filed | Jan. 23, 1969 |
| [45] | Patented | July 13, 1971 |
| [73] | Assignee | Precision Agricultural Machinery Company<br>Phoenix, Ariz. |

[54] METHOD FOR SIMULTANEOUSLY IRRIGATING AND FERTILIZING AN AGRICULTURE FIELD
1 Claim, 4 Drawing Figs.

[52] U.S. Cl. .................................................. 239/10,
 239/418, 239/543
[51] Int. Cl. .................................................. B05b 1/26
[50] Field of Search .......................................... 239/162,
 186, 8, 9, 10, 11, 212, 213, 230, 233, 246, 248,
 266, 418, 419, 420, 450, 543, 544, 545

[56] References Cited
UNITED STATES PATENTS

| 2,156,655 | 5/1939 | Morgan | 239/418 X |
| 2,497,101 | 2/1950 | Starr | 239/420 X |
| 2,676,471 | 4/1954 | Pierce, Jr. | 239/8 X |
| 2,792,256 | 5/1957 | Sinex | 239/233 |
| 3,030,031 | 4/1962 | Barker | 239/543 X |
| 3,195,273 | 7/1965 | Scott et al. | 239/543 X |
| 3,353,751 | 11/1967 | Dowd | 239/212 X |
| 3,361,364 | 1/1968 | Purtell | 239/213 X |

Primary Examiner—M. Henson Wood, Jr.
Assistant Examiner—John J. Love
Attorneys—Richard L. Kelly, Carl A. Cline, Forrest D. Stine and Richard A. Anderson ABSTRACT: This invention relates to an agricultural process, and apparatus for carrying out the process, in which chemicals that are to be applied to a growing crop are admixed with irrigation water that is sprayed onto the crop. The irrigation water and the liquid chemicals (usually in the form of aqueous solutions, dispersions or emulsions) are delivered by separate lines to separate nozzles which are positioned in such a manner that the agricultural product streams issuing therefrom converge and mix exterior to the nozzles whereinafter the mixed stream falls upon the desired location.

METHOD FOR SIMULTANEOUSLY IRRIGATING AND FERTILIZING AN AGRICULTURE FIELD

This invention relates to sprinkling methods and apparatus. More particularly this invention relates to methods and apparatus for mixing and spraying liquids which interact when mixed.

The desirability of using mixed liquid sprays is well known in a wide variety of industries. In many instances, when the separate liquids are mixed, they react, or otherwise interact, to form a product, such as a precipitate or a corrosive compound, which is detrimental to the equipment. For this reason, if interacting mixed liquids are to be used, mixing must usually be followed by a removal step such as filtration or the like, prior to delivery of the mixed liquids to the spraying apparatus.

The agricultural industry is one area in which mixed liquids can be widely and advantageously employed. For example, plant nutrients and pesticides (for purposes of this application the term "pesticide" shall mean any chemical applied to a commercial crop to eliminate or reduce damage by any environmental factor and includes chemicals which traditionally are referred to as herbicides, nematocides, fungicides, and insecticides), can be mixed together and/or with irrigating water to accomplish more economically in a single application what would, in unmixed form, require two or more operations to do. Unfortunately it has been found that not all plant nutrients, and pesticides can be simply mixed together or with irrigating water. Many of these chemicals when mixed in a liquid form interact to form insoluble precipitates which if allowed to enter or form in irrigation and sprinkling apparatus would severely foul and damage it. For example, an especially acute precipitate problem arises when pesticides or fertilizers containing phosphate compounds are admixed with hard irrigating water. Metallic ions such as calcium, magnesium, and the like found in hard water, react with these phosphate compounds to form water-insoluble precipitates such as calcium ammonium pyrophosphate, which seriously foul irrigation and sprinkling equipment. Since much of the water used for irrigation is generally hard water, this problem seriously limits the extent to which the very desirable technique of mixed liquid sprinkling can be used.

It is a purpose of this invention to provide unique methods and apparatus for mixing and delivering interacting liquids which overcome the above-described problems heretofore experienced by the art.

Basically, the methods contemplated in accordance with this invention are comprised of the steps of:
a. providing for each liquid which will interact, a source separate from the other liquids which will interact,
b. delivering from each of said sources of separate flow of each of the interacting liquids to a separate stream-forming means for each of said liquids,
c. forming initially separate but converging streams of each of said liquids with said separate stream-forming means, said separate streams converging at a point sufficiently exterior to said stream-forming means so that any precipitate formed by the interaction of said liquids will not clog said stream-forming means,
d. mixing said interacting liquids at about the point of convergence of said streams, and
e. delivering the mixed liquids to a desired location.

The apparatus contemplated in accordance with this invention are basically comprised of; means for delivering each interacting liquid separately from one another to a stream-forming means, said stream-forming means being comprised of separate means for forming a separate stream of each of said interacting liquids, said separate means for forming a separate stream of each interacting liquid being aligned so that streams issuing therefrom will converge at a point sufficiently exterior to said stream-forming means to prevent any precipitate formed upon convergence of said streams from clogging said stream-forming means. Preferably the separate means for forming streams are nozzles and the apparatus is provided with a rocker arm or other similar means for breaking up the mixed liquid stream into droplets.

The above-described methods and apparatus may be used in a wide variety of environments wherein delivery of mixed liquids is required or desirable. A particularly preferred environment, as hereinafter more fully described, is that of agricultural irrigation since the above-described, methods and apparatus may be used to sprinkle crops and/or soil without fear of fouling from chemical precipitation or the like.

IN THE DRAWINGS

Figure 1:
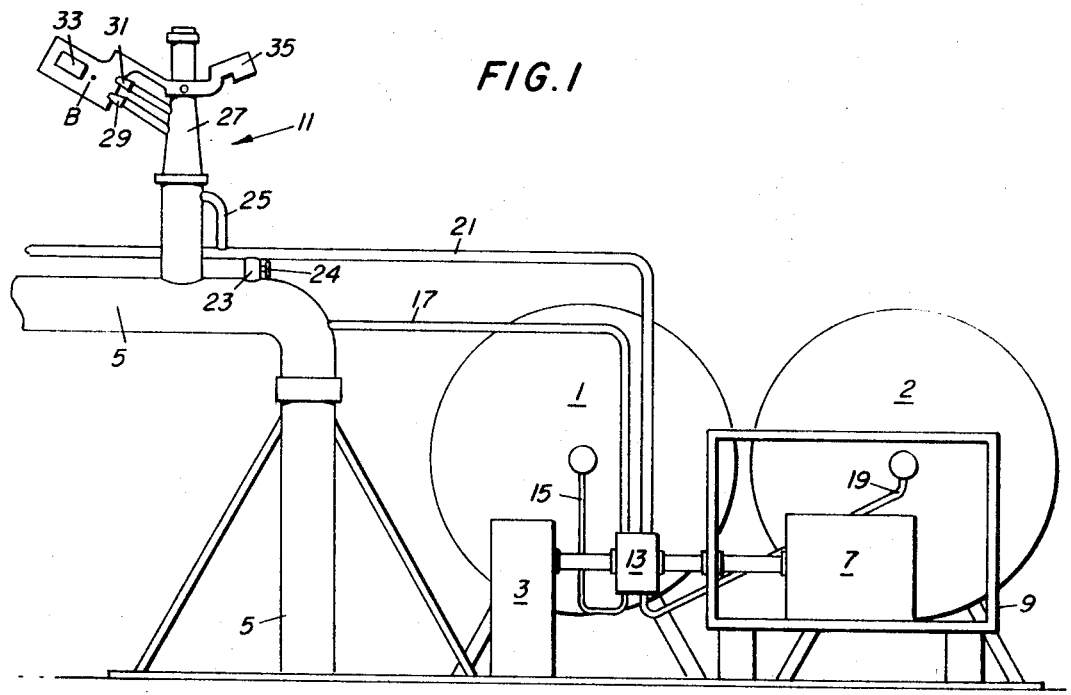
FIG. 1 is a front plan view of one preferred environmental embodiment in accordance with this invention.

Referring to FIG. 1 and in accordance with one preferred embodiment as contemplated by this invention there is illustrated an apparatus for treating a field and/or crops with water, pesticide, and/or plant nutrients. Tank 1 is a conventional tank suitable for holding a stored amount of a liquid agricultural chemical usually in aqueous solution form which will not form a clogging precipitate when dissolved in hard water. Examples of such noninteracting agricultural chemicals include the well known water-soluble pesticides and nitrogen fertilizers which are completely soluble in hard water under all practical use conditions. Tank 2 is another conventional tank suitable for holding a stored amount of an agricultural liquid chemical which when mixed with hard water or the agricultural chemical in tank 1, will form a product (e.g. a water-insoluble precipitate) detrimental to the equipment it contacts. Examples of such agricultural chemicals include phosphate-containing plant nutrients such as aqueous solutions of fertilizers containing N/P/K in the ratios of 4-10-10; 7-21-7; 2-612 and 10-34-0. Also included are various pesticides such as amine salts of 2,4-D, emulsified esters of 2,4-D, Amiben (3-amino-2,5-dichlorobenzoic acid) alanap plus (basically sodium N-1-naphthyphthalamate), dianap and aldrin (95 percent hexachloro-hexahydro-endo, dimetharonaphthalene). Irrigating water is supplied to the system by irrigation pump 3 which delivers water from a well or reservoir (not shown) in a known fashion to water conduit 5. Water conduit 5, as partially illustrated, extends upwardly and outwardly across a field to be treated. In this respect, conduit 5 can be totally stationary as illustrated, or it can be part of a number of conventional self-propelled irrigation conduit systems (as hereinafter more fully described) which systems actually move through a field to effect more efficient irrigation. Irrigation pump 3 is conveniently powered by engine 7 housed in safety casing 9.

The liquids from tanks 1 and 2 are separately delivered without mixing to sprinkling device 11 by conventional dual delivery pump 13 (also powered by engine 7) which draws the noninteracting liquid from tank 1 through line 15 and pumps it through line 17 into water conduit 5. This same pump 13 draws the interacting liquid from tank 2 through line 19 and pumps it via line 21 into sprinkling device 11. Line 21 may be conveniently made of a noncorrosive plastic material while all other lines may be of conventional galvanized steel. Interconnecting line 21 and water conduit 5 is a flush line 23 provided with an open-close valve 24 (shown more fully in FIG. 2). During periods when the field is being treated with the interacting chemicals in tank 2, valve 24 is closed to prevent intermixing of the interacting chemicals with the hard water and/or noninteracting chemicals in conduit 5. However, when the field is not being treated with interacting chemicals, valve 24 may be opened to provide double-nozzle irrigation. It is understood, of course, that at times, irrigation pump 3 will be shut down so that only chemical treatment of the field or crops and no irrigation is taking place. In this instance, valve 24 will be opened or closed depending upon whether the agricultural liquids in tanks 1 and 2 interact between themselves.

Figure 2:
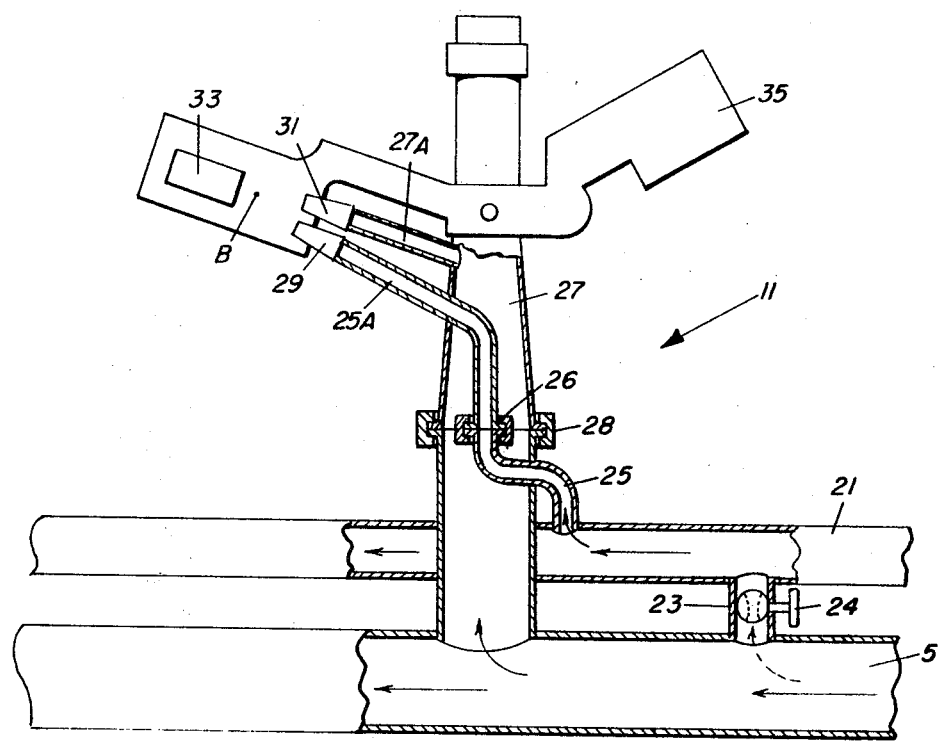
FIG. 2 is a partially sectionalized view of a sprinkler apparatus in accordance with this invention.

As illustrated more fully in FIG. 2, sprinkler device 11 is preferably a rotary sprinkler comprised of two separate delivery conduits, conduit 25 extending from line 21 and conduit 27 extending from conduit 5. Conduit 27 is preferably truncated at its upper end as illustrated to provide better stream pressure therein. Conduit 25 is connected to a conventional nozzle 29 and conduit 27 has extending from one wall thereof a second conduit 27A which terminates in nozzle 31 similar in construction to nozzle 29. Conduits 25 and 27A as well as nozzles 29 and 31 are preferably so aligned that the streams issuing therefrom converge at a point B just prior to splatter block 33 in conventional rocker arm 35. Point B is located sufficiently far from nozzles 29 and 31 so that any precipitate formed by the liquid streams, when they mix upon convergence about point B, will not clog or damage the nozzles. Usually a distance of about 1 inch or more from the nozzles is sufficient to insure against clogging. In some instances, of course, point B will not actually exist since convergence may be totally effected by the two separate streams hitting splatter block 33 and being mixed thereby.

Rocker arm 35 provided with splatter block 33 is a conventional piece of equipment in the sprinkling art which serves to break the stream into droplets and thus to enlarge the pattern of distribution of the liquid. Although a rocker arm is preferred for this purpose, it is understood that any other wellknown device may also be used. In this respect, splatter block 33 serves also as a mixing device which serves to further mix the liquids which have converged. Thus any other device used in place thereof should also preferably aid in mixing the liquid streams.

As stated above sprinkler device 11, is preferably a rotary device. That is to say, conduit 27 is actually formed of two conduit pipes sealingly engaged by conventional rotary joint 28. Likewise, conduit 25 is formed of two conduit pipes sealingly engaged by conventional rotary joint 26. Obviously, joint 26 will be located concentrically within conduit 27 so that when fluid pressure issuing from nozzles 29 and 31 cause device 11 to rotate about joints 26 and 28, conduit section 25A will freely rotate in joint 26 and will not bind in conduit 27.

It is understood, of course, that sprinkler device 11 may be stationary rather than rotary. Such a device might be used for instance when only a particular area in a field need be treated.

The operation of the illustrated device, once given the above description, is apparent to those skilled in the art. In practice, conduit 5 and line 21 will extend across a field of crops. Mounted interconnectingly with these lines will be a plurality of sprinkler devices 11 evenly spaced along the lines to insure an even distribution of treating liquid on the field. If, for example, the field has not yet been planted, preplant irrigation and fertilization may be effected in one application. One typical preplant irrigation and fertilization technique would provide for 400 lbs. of 4-10-10 liquid mix (NPK) and 250 lbs. of 32-0-0 solution (NPK). When pumped as hereinafter described, the above will result in plant food rates per acre of 100 pounds, nitrogen; 50 pounds, $P_2O_5$; and 50 pounds, $K_2O$.

The 250 lbs. of 32 percent solution is comprised totally of water-soluble nitrogen compounds which have no precipitation characteristics and are thus placed in tank 1. The 400 lbs. of 4-10-10 liquid mix are precipitate-prone when mixed with irrigation water of high calcium content (510 p.p.m) and thus -10-10 are placed in tank 2. Irrigation pump 3 is turned on and water is pumped through conduit 5 at a pressure of about 75 p.s.i. The solution in tank 1 is metered through line 15 to dual pump 13 which is regulated to send sufficient solution through line 17 to provide 250 lbs. per acre of the solution into conduit 5. The 4-10-10 liquid mix is in like manner metered through line 19, dual pump 13 and line 21 to provide 400 lbs. per acre of the liquid to the field over the period of irrigation. As illustrated by the arrows in FIG. 2, a portion of the irrigation water and 32 percent solution issue through nozzle 31 whereupon they converge and mix for the first time with the precipitate-prone liquid issuing from nozzle 29. Valve 24 in line 23, during this operation is, of course, closed. The mixed-liquid stream is further mixed by splatter block 33 on rocker arm 35 whereupon it is broken up into droplets and distributed in a pattern on a portion of the field. The rest of the field is treated in like manner by the rest of the liquid which was not taken into the first sprinkler device 11 but rather proceeded to the other sprinkler devices on conduits 5 and 21 extending across the field.

Figure 3:
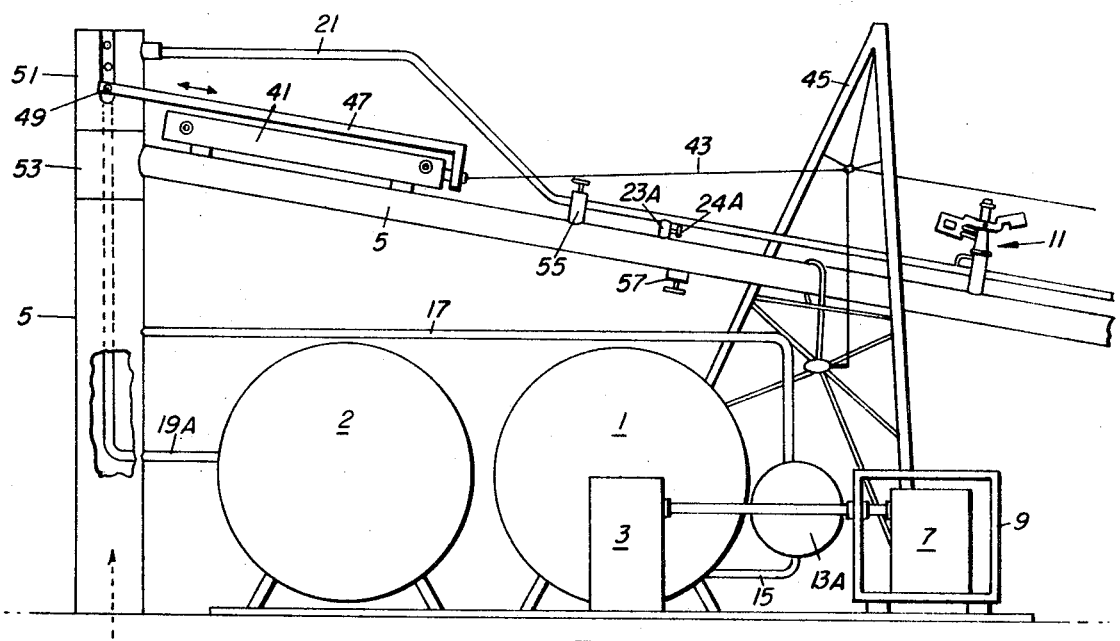
FIG. 3 is a a partially sectionalized plan view of another preferred environmental embodiment in accordance with this invention.

Referring to FIG. 3, there is illustrated another preferred embodiment in accordance with this invention. Basically this embodiment is substantially similar in operation to the embodiment illustrated in FIGS. 1—2. Thus like parts have been designated with like numbers. The embodiment in FIG. 3 differs from that illustrated in FIGS. 1—2, however, in that it is adapted for use with a particularly preferred type of selfpropelled irrigation system. The actual irrigation system used is only partially shown for clarity; since it is conventional in the art as disclosed in U.S. Pat. Nos. 3,342,417; 3,353,750; 3,353,751; 3,373,939; and "Walking Water Pivot Sprinkler System," Farmhand Corp., Hopkins, Minn., the disclosures of which are incorporated herein by reference.

In typical operation, the above-described irrigation system causes a water conduit 5 having thereon a plurality of sprinklers to move through a field. This is accomplished by a reciprocating hydraulic cylinder means 41 which reciprocates wire 43 and thereby causes, in known fashion, a plurality of support towers 45 to "walk" across a field.

In accordance with this invention, and when one or more interacting agricultural chemicals as described above are to be applied to a field, this basic "walking" apparatus may be used by adapting it preferably as illustrated in FIG. 3. As shown in FIG. 3, reciprocating hydraulic cylinder means 41 (reciprocated by conventional power means not shown) has connected thereto, one end of lift-pump handle 47 whose other end is connected at pin 49 to lift-pump 51.

Lift-pump 51 is of conventional design and is bolted or welded into place on top of the elbow section 53 of conduit 5. Connected to lift-pump 51 and running longitudinal through the vertical section of conduit 5 is pipe 19A whose rearward end is connected to tank 2.

In operation of the device illustrated in FIG. 3, engine 7 drives irrigation pump 3 which pumps hard irrigation water through conduit 5. Engine 7 also drives single-action pump 13A of conventional design which meters a noninteracting liquid or slurried agricultural chemical from tank 1, through line 15, into line 17, and finally directly into the irrigation water being pumped through conduit 5. As described above, because the agricultural chemical in tank 1 will not deleteriously interact with hard water, it may be admixed with the irrigation water in conduit 5.

Reciprocating hydraulic cylinder means 41 not only causes tower 45 to walk across the field being treated, but also causes lift-pump handle 47 to reciprocate as well. This in turn activates and runs lift-pump 51 in known fashion, which pumps the interacting agricultural chemical from tank 2 through line 19A and into line 21. Line 21 and conduit 5 are connected to rotary sprinkler 11 as more fully illustrated in FIG. 2. As is clearly seen, the interacting chemical contained in tank 2 admixes with the water and chemical from tank 1 only upon issuing from the nozzles in sprinkler 11. Thus the system as a whole, in accordance with this invention, has been fully protected.

The use of a lift-pump 51 activated and run by a reciprocating hydraulic cylinder means 41 lends to the system a unique advantage. Because the hydraulic cylinder used is preferably a slow-action reciprocating cylinder, very accurate metering of the agricultural chemical in tank 2 may be effected.

Figure 4:
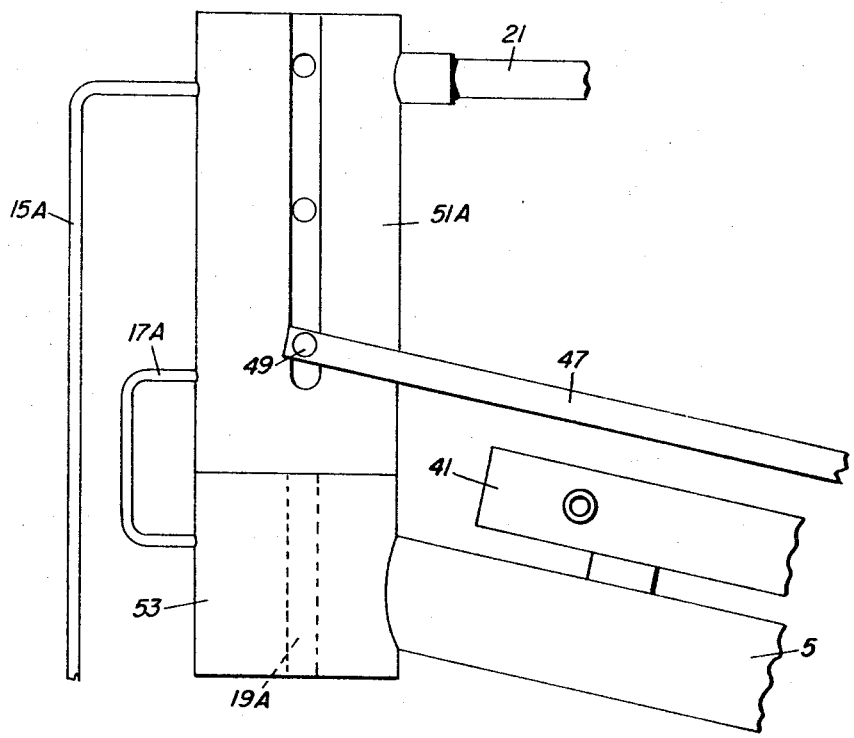
FIG. 4 is a side plan view of an alternative conduit arrangement for the embodiment illustrated in FIG. 3.

In order to take full advantage of the accurate metering available when using a lift-pump run by a reciprocating hydraulic cylinder, this invention contemplates still another preferred embodiment. As illustrated in FIG. 4, this embodiment is similar to that illustrated in FIG. 3 except that lift-pump 51 is replaced by dual-action lift-pump 51A of conventional design. By using a dual-action lift-pump 51A, pump 13A run by engine 7 may be eliminated. Line 15A then directly connects tank 1 with pump 51A as partially illustrated, and line 17A serves as a conduit from lift-pump 51A into elbow section 53 of conduit 5.

As is clearly seen, in operation, both of the agricultural chemicals from tanks 1 and 2 are accurately metered because the amounts of both are now controlled by reciprocating cylinder means 41. The noninteracting chemical from tank 1 is pumped by pump 51A through line 15A into line 17A which injects the chemical directly into the irrigation water in conduit 5. On the other hand, dual pump 51A maintains the interacting chemical in tank 2 separate from the materials in conduit 5 by pumping it through line 19A and into line 21.

In order to lend further flexibility to the systems of FIGS. 3-4, line 21 is provided with an open-close valve 55. Between line 21 and conduit 5 there is provided a connecting line and valve means 23A and 24A. Immediately following (i.e. downstream) of line 23A, there is provided in conduit 5 an open-close valve 57.

In normal operation, that is to say, when chemicals from both tanks 1 and 2 as well as water are being applied to the field, valves 55 and 57 will be in open position and valve 24A will be closed. If it becomes desirable or necessary to treat a field by using only water and the chemical in tank 1, valve 55 will be closed and valve 24A opened. This allows the fluid in conduit 5 to also flow through line 21, thus effecting maximum delivery. If it becomes desirable to deliver a very high concentration of the chemical in tank 1 without using the chemical in tank 2, valves 55 and 57 will be closed and valve 24A opened. Irrigation pump 3 will be adjusted to run at low r.p.m., which limits the volume of water to only that amount necessary to carry the chemical of tank 1 at a desired concentration into line 21 (conduit 5 being closed) which delivers it to sprinkler 11 for distribution onto the field. Due to the high concentration of the chemical in tank 1 now effected, greater foliar response will result.

Once given the above disclosure many variations, modifications, and other features will become apparent to those skilled in the art. For example, where more than one interacting liquid is used, a third converging nozzle, delivery line, pump, and tank would be provided similar to nozzle 29 etc. and thereby allow one application to do what heretofore has to be accomplished by three applications. Such variations, modifications, and other features are thus considered to be a part of this invention, the scope of which is to be determined by the following claims.

I claim:

1. A method for simultaneously irrigating an agricultural field and fertilizing it with a water-soluble phosphate compound which forms water-insoluble precipitates with calcium and/or magnesium ions which comprises:

a. providing a source of irrigation water containing calcium and/or magnesium ions and a separate source of an essentially calcium and magnesium ion free water solution of a water-soluble phosphate fertilizer, said irrigation water and said aqueous phosphate solution being such that upon being mixed together they will form a water-insoluble phosphate precipitate, b. delivering from each of said separate sources a separate flow of said irrigation water and said water-soluble phosphate solution to a separate stream-forming means for said irrigation water and said water-soluble phosphate solution, c. forming initially separate but converging streams of said irrigation water and said water-soluble phosphate solution with said separate stream-forming means, said separate stream-forming means converging at a point sufficiently exterior to said stream-forming means so that any precipitate formed upon convergence of said irrigation water and said water-soluble phosphate solution will not clog said stream-forming means, d. mixing said irrigation water and said water-soluble phosphate solution at about the point of convergence of said streams, and e. delivering the irrigation-water water-soluble phosphate solution mixture to an irrigatable location of said field.